237-129
8/5/86 03 000109

United States Statutory Invention Registration [19]

[11] Reg. Number: H109

[45] Published: Aug. 5, 1986

Gardner et al.

[54] SMOKE GENERATOR

[75] Inventors: Christian S. Gardner, Edgewood; Eric J. Boschert, Riverdale, both of Md.

[73] Assignee: The United States of America as represented by the Secretary of the Army, Washington, D.C.

[21] Appl. No.: 798,077

[22] Filed: Nov. 14, 1985

Related U.S. Application Data

[63] Continuation of Ser. No. 577,462, Feb. 6, 1984, abandoned.

[51] Int. Cl.[4] ..... B05B 1/24

[52] U.S. Cl. ..... 239/129; 239/325; 239/373; 239/367

[58] Field of Search ..... 239/129, 310, 311, 367, 239/346, 373, 135, 136; 406/141, 142; 102/334; 89/36.0, 1.11

[56] References Cited

U.S. PATENT DOCUMENTS

| | | | |
|---|---|---|---|
| 2,707,132 | 4/1955 | Baresch | 406/142 X |
| 2,850,329 | 9/1958 | Pyle et al. | 406/142 |
| 4,502,819 | 3/1985 | Fujii et al. | 406/142 X |

FOREIGN PATENT DOCUMENTS 115641 5/1919 United Kingdom .

*Primary Examiner*—John F. Terapane
*Assistant Examiner*—S. Wolffe
*Attorney, Agent, or Firm*—Anthony T. Lane; Harold H. Card, Jr.; Michael C. Sachs

[57] ABSTRACT

A smoke generator having an air-powder mixing container with vacuum line attachment to a mechanical smoke dispersing apparatus. The container has funnel shaped side walls to direct powder to a reduced container bottom. A pressurized input line extends to a point on the container bottom as does a vacuum powder outlet line. The powder outlet line is connected to a venturi mounted to the exhaust port of a small turbine engine. This draws the air-powder mixture from the container directly into the turbine exhaust and into the atmosphere.

5 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SMOKE GENERATOR

GOVERNMENT INTEREST

The invention described herein may be manufactured and/or used by or for the Government for Governmental purposes without the payment of any royalty thereon.

This application is a continuation of application Ser. No. 577,462, filed Feb. 6, 1984, now abandoned.

BACKGROUND OF THE INVENTION

Ships, troops, and vehicles in combat situations attempt to hide themselves from the enemy as they manuever and prepare for battle. Ships and vehicles burn a rich fuel or fog oil that emits clouds of smoke. Troops have smoke grenades that emit smoke when ignited or fired. Fogging machines are also used in agriculture for spraying various chemicals to fulfill their various functions of covering and/or hiding objects. Usually the ingredients are liquid in nature and thus are relatively easily mixed and propelled into the atmosphere.

SUMMARY OF THE PRESENT INVENTION

In accordance with the present invention, a mixing and ejecting apparatus generates and disburses a powdered smoke into the atmosphere for concealing military activities from infrared detection devices. The grain size of the powder is between 1 and 10 microns. One such type of powder used is fly ash, a burnt charcoal dust.

A large funnel is mounted within a 55 gallon drum with the funnel end resting on the drum bottom. The drum is sealed to facilitate removal of the smoke powder in the funnel without loss of powder through the top of the drum. A low pressure or vacuum line extends to the base of the funnel in order to empty the powder in the funnel. A small turbine engine has a compressor that provides a pressurized input to the interior of the funnel. It also has a venturi attached to the exhaust port which connects with the vacuum line to provide the vacuum for powder withdrawal and dispersement into the atmosphere creating a dust cloud concealment cover. This apparatus may be used in combination with fog oil dispersion equipment, if desired, for visual concealment as well as infrared concealment.

DETAILED DESCRIPTION OF PREFERRED EMBODIMENT

Figure 1:
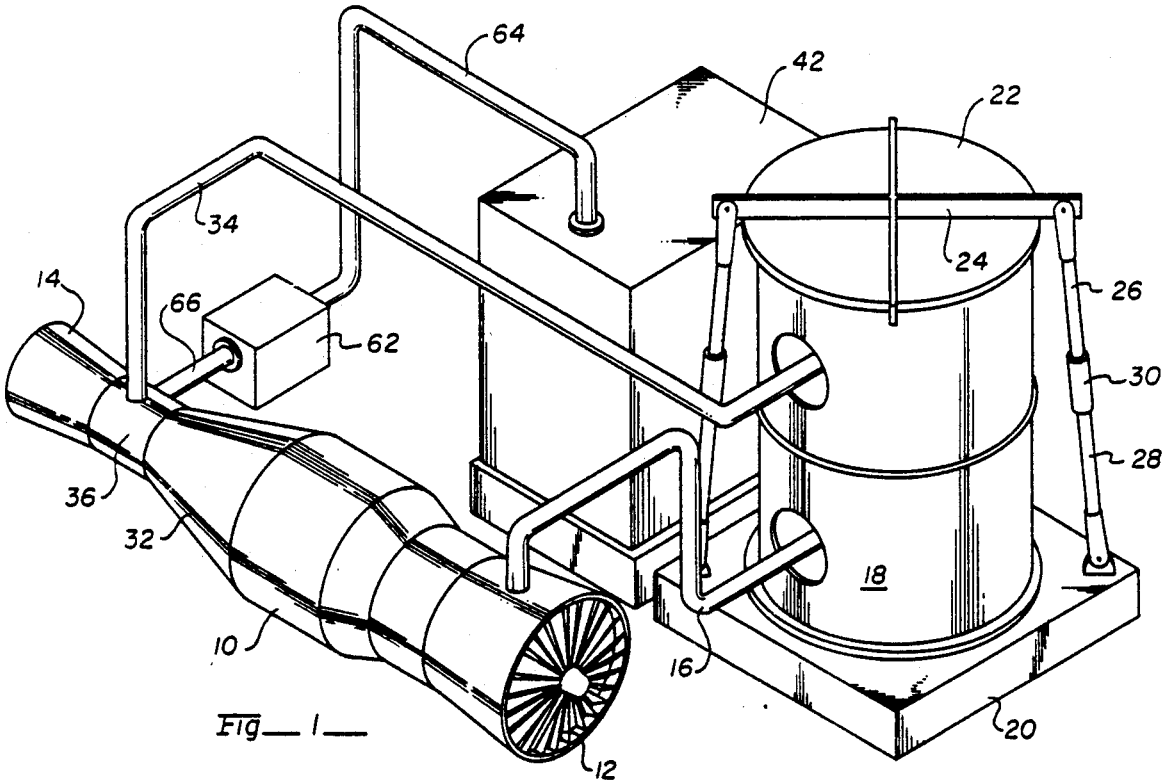
FIG. 1 is a perspective view of the portable powder smoke generator in combination with fog oil dispersion equipment.

Reference is now made to FIG. 1 wherein is shown a turbine engine 10 having a compressor section air inlet 12 and an exhaust port 14. Connected to the compressor section is an input line 16 extending into a 55 gallon drum 18. This drum sets on a base 20 and has a cover 22 which is held by a retainer 24 for stabilization and lid sealing purposes. This retainer is fastened to the base 20 through connecting rods 26, 28, and turnbuckle 30 on each side. The exhaust port 14 on engine 10 has a venturi nozzle 32 which has the outlet line 34 from drum 18 connected at its throat portion 36 to provide a reduced pressure to the line.

Also part of the smoke generating system is the fog oil tank 42 connected to a pump 62 thru the use of hose 64. Pump 62 is then connected to a nozzle located in the venturi nozzle 32 of the turbine 10 by a second hose 66. The pump 62 is operated from 24 volts DC provided by the turbine 10.

Figure 2:
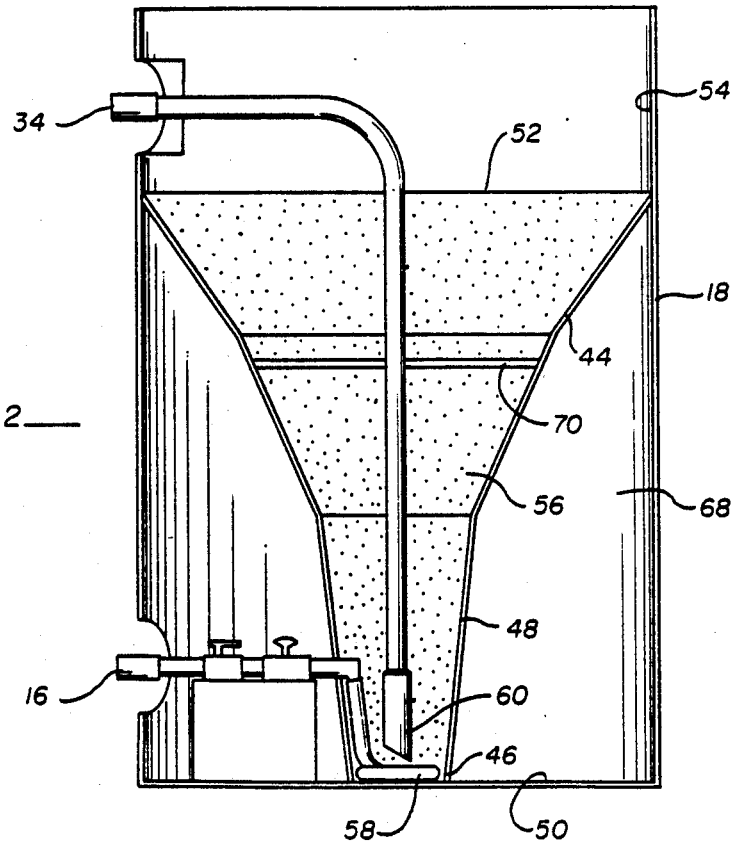
FIG. 2 is a vertical sectional view of the mixing apparatus.

A vertical sectional view of the drum 18 is shown in FIG. 2. A large funnel 44 is positioned within the drum with the end 46 of the funnel neck 48 sealed to the drum bottom 50. The funnel top 52 is sealed to the inner surface 54 of the drum 18 so that the interior of the funnel 44 does not leak powder to the cavity 68. The funnel contains smoke powder 56. The input line 16 and output line 34 terminate at 58 and 60 near the end 46 inside the funnel 44. The combination of pressure in line 16 and vacuum in line 34 causes the powder 56 to fluidize or mix with air and exit through line 34 and out the venturi nozzle 32 shown in FIG. 1.

This end 58 of the pressure line 16 takes the form of a ring around the base 46 of the funnel 44. This ring is used to direct the air across the bottom of the funnel to the section line 34 thus creating a localized fluidized bed.

In FIG. 2, there are shown two supports 70 which are ½ diameter rods welded on either end to the suction hose 34 and the funnel 44. These supports are only for stabilization of tube 34 during transport and/or loading procedures.

The invention in its broader aspects is not limited to the specific combinations, improvements, and instrumentalities described but departures may be made therefrom within the scope of the accompanying claims without departing from the principles of the invention and without sacrificing its chief advantages.

What is claimed is:

1. A smoke, obscurant generation system, having a turbine jet engine, comprising (i) a fog source of oil comprising a means for pumping oil having a pipe output means connected to the exhaust port of said jet engine; and (ii) a power, smoke generator comprising a container having powder therein, including an input line connected to an air pressure source, an outlet line connected to the exhaust port of said jet engine, and means for discharging to atmosphere powder exiting said container through said outlet line, said container having a bottom and inclined walls to reduce the size of said bottom, said input and said outlet lines terminating in said container near said bottom, said input line end taking the form of a ring around the container funnel bottom to create a localized fluidized bed.

2. A smoke, obscurant generation system, having a turbine jet engine, comprising (i) a fog source of oil comprising a means for pumping oil having a pipe output means connected to the exhaust port of said jet engine; and (ii) a powder, smoke generator comprising a container having powder therein, an input line connected to an air pressure source, an outlet line connected to a reduced pressure source, and means for discharging to the atmosphere powder exiting said container through said outlet line, said container having a bottom and inclined walls to reduce the size of said bottom, said input and said outlet lines terminating in said bottom, said input line end taking the form of a ring around the container funnel bottom to create a localized fluidized bed.

3. A smoke powder generator as defined in claim 1 wherein said means discharging is a venturi tube connected to said outlet line.

4. A smoke powder generator as defined in claim 3 wherein said venturi tube is connected to the exhaust port of a turbine engine.

5. A smoke powder generator as defined in claim 1 wherein said air pressure source is the compressor section of a turbine engine.

* * * * *